(12) United States Patent
Izumi et al.

(10) Patent No.: US 11,433,531 B2
(45) Date of Patent: Sep. 6, 2022

(54) ROBOT SYSTEM AND METHOD FOR CONTROLLING ROBOT

(71) Applicant: KABUSHIKI KAISHA YASKAWA DENKI, Kitakyushu (JP)

(72) Inventors: Tetsuro Izumi, Kitakyushu (JP); Shohei Ohno, Kitakyushu (JP); Takashi Nishimura, Kitakyushu (JP); Tamio Nakamura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 595 days.

(21) Appl. No.: 16/367,518

(22) Filed: Mar. 28, 2019

(65) Prior Publication Data

US 2019/0299399 A1 Oct. 3, 2019

(30) Foreign Application Priority Data

Mar. 30, 2018 (JP) .............................. JP2018-067031

(51) Int. Cl.
*G05B 19/04* (2006.01)
*B25J 9/10* (2006.01)
(Continued)

(52) U.S. Cl.
CPC ........... *B25J 9/1005* (2013.01); *B25J 9/1612* (2013.01); *B25J 9/1633* (2013.01); *B25J 13/003* (2013.01);
(Continued)

(58) Field of Classification Search
CPC ........ G05B 19/423; G05B 2219/37411; G05B 2219/39295; G05B 2219/39319;
(Continued)

(56) References Cited

U.S. PATENT DOCUMENTS

| 4,432,063 A | * | 2/1984 | Resnick | ................... B25J 9/161 |
| | | | | 318/568.13 |
| 4,907,169 A | * | 3/1990 | Lovoi | .................... B23K 26/04 |
| | | | | 219/124.34 |

(Continued)

FOREIGN PATENT DOCUMENTS

| CN | 103038028 A | * | 4/2013 | ........... G05B 19/423 |
| JP | 2005-293098 A | | 10/2005 | |

(Continued)

OTHER PUBLICATIONS

European Office Action dated Jun. 15, 2021 in European Patent Application No. 19163085.4, 13 pages.

(Continued)

*Primary Examiner* — Harry Y Oh
(74) *Attorney, Agent, or Firm* — Oblon, McClelland, Maier & Neustadt, L.L.P.

(57) ABSTRACT

A robot system includes a robot including leading end, base, and multi-articular arm, and circuitry that controls the atm to move the end based on motion control program specifying transition over time of target position and posture of the end, the transition including correction target portion starting and ending in the transition; controls the arm to move the end in response to guided manipulation applying external force to the robot while the circuitry controls the arm; obtains relative command information based on the target position and posture at start of the correction portion and specifying the target position and posture at points in the correction portion including start and end in the correction portion; and controls the arm to move the end from the position and posture based on the information, beginning at time when movement of the arm controlled by the circuitry in response to the manipulation has ended.

19 Claims, 14 Drawing Sheets

(51) Int. Cl.
*B25J 9/16* (2006.01)
*B25J 13/00* (2006.01)
*G05B 19/423* (2006.01)
*B25J 9/06* (2006.01)

(52) U.S. Cl.
CPC ............... *G05B 19/423* (2013.01); *B25J 9/06* (2013.01); *G05B 2219/37411* (2013.01); *G05B 2219/39295* (2013.01); *G05B 2219/39319* (2013.01); *G05B 2219/39343* (2013.01); *G05B 2219/40201* (2013.01); *G05B 2219/40202* (2013.01); *G05B 2219/40385* (2013.01)

(58) Field of Classification Search
CPC ........... G05B 2219/39343; G05B 2219/40201; G05B 2219/40202; G05B 2219/40385; B25J 13/003; B25J 9/06; B25J 9/1005; B25J 9/1612; B25J 9/1633
See application file for complete search history.

(56) References Cited

U.S. PATENT DOCUMENTS

| | | | | |
|---|---|---|---|---|
| 2006/0178775 A1* | 8/2006 | Zhang | ...................... | B25J 13/02 700/245 |
| 2011/0288667 A1* | 11/2011 | Noda | ..................... | G05B 19/42 700/98 |
| 2015/0081099 A1* | 3/2015 | Komatsu | ................. | B25J 13/085 700/258 |
| 2015/0290809 A1* | 10/2015 | Nakagawa | .............. | B25J 9/1676 700/258 |
| 2016/0214261 A1* | 7/2016 | Davis | ...................... | B25J 9/1676 |
| 2017/0028557 A1* | 2/2017 | Battisti | .................. | B25J 9/1684 |
| 2017/0285625 A1* | 10/2017 | Sato | ...................... | G05B 19/423 |

FOREIGN PATENT DOCUMENTS

| | | |
|---|---|---|
| JP | 2006-82185 A | 3/2006 |
| JP | 2007-249267 A | 9/2007 |
| JP | 2010-234521 A | 10/2010 |
| JP | 2018-39086 A | 3/2018 |

OTHER PUBLICATIONS

Extended European Search Report dated Aug. 29, 2019 in Patent Application No. 19163085.4, 12 pages.

Office Action dated Oct. 26, 2021 in corresponding Japanese Patent Application No. 2018-067031 (with English Translation), 9 pages.

* cited by examiner

FIG. 3

| Command number | Command | Correction target flag |
|---|---|---|
| 001 | Move to point 1 | 0 |
| 002 | Hold workpiece | 0 |
| 003 | Move to point 2 | 0 |
| 004 | Move to point 3 | 0 |
| 005 | Move to point 4 | 0 |
| 006 | Move to point 5 | 0 |
| 007 | Move to point 6 | 0 |
| 008 | Move to point 7 | 0 |
| 009 | Move to point 8 | 0 |
| 010 | Move to point 9 | 0 |
| 011 | Move to point 10 | 1 |
| 012 | Release workpiece | 1 |
| 013 | Move to point 9 | 1 |
| 014 | Move to point 8 | 0 |
| ... | ... | ... |

ROBOT SYSTEM AND METHOD FOR CONTROLLING ROBOT

CROSS-REFERENCE TO RELATED APPLICATIONS

The present application claims priority under 35 U.S.C. § 119 to Japanese Patent Application No. 2018-067031, filed Mar. 30, 2018. The contents of this application are incorporated herein by reference in their entirety.

BACKGROUND

Field of the Invention

The embodiments disclosed herein relate to a robot system and a method for controlling a robot.

Discussion of the Background

JP 2006-82185A discloses a method for guiding a robot. The method includes: a first step in which the robot stops during a reproduction motion that is based on a work program registered in advance; a second step of permitting direct manipulation of the robot; a third step of directly manipulating the robot to make a guided motion; a fourth step of prohibiting the direct manipulation of the robot; and a fifth step in which the robot continues the reproduction motion based on the work program. If, at the third step, any teaching point is modified in position, the motion of the robot at the fifth step is a motion equivalent to linear interpolation between the modified teaching point and the next, unmodified teaching point.

SUMMARY

According to one aspect of the present disclosure, a robot system includes a robot including a leading end, a base, and a multi-articular arm that adjusts a position and a posture of the leading end relative to the base, and circuitry that controls the multi-articular arm to move the leading end based on a motion control program that specifies a transition over time of a target position and a target posture of the leading end relative to the base, the transition including a correction target portion that starts and ends in the transition; controls the multi-articular arm to move the leading end in response to a guided manipulation that applies an external force to the robot while the circuitry is controlling the multi-articular arm; obtains relative command information that is based on the target position and the target posture of the leading end at a start point of the correction target portion and that specifies the target position and the target posture of the leading end at points in the correction target portion including a start point and an end point in the correction target portion; and controls the multi-articular arm to move the leading end from the position and the posture of the leading end based on the relative command information, beginning at a point of time when movement of the multi-articular arm controlled by the circuitry in response to the guided manipulation has ended.

According to another aspect of the present disclosure, a method for controlling a robot including a leading end, a base, and a multi-articular arm to adjust a position and a posture of the leading end relative to the base includes performing, using circuitry, normal control that includes controlling the multi-articular arm to move the leading end based on a motion control program that specifies a transition over time of a target position and a target posture of the leading end relative to the base, the transition including a correction target portion that starts and ends in the transition, performing, using the circuitry, force guide control that includes controlling the multi-articular arm to move the leading end in response to a guided manipulation that applies an external force to the robot during the normal control, obtaining relative command information that is based on the target position and the target posture of the leading end at a start point of the correction target portion and that specifies the target position and the target posture of the leading end at points in the correction target portion including a start point and an end point of the correction target portion, and performing correction control that comprises controlling the multi-articular arm to move the leading end from the position and the posture of the leading end based on the relative command information beginning at a point of time when movement of the multi-articular arm under the force guide control has ended.

The present disclosure provides a robot system that is effective for saving labor of a human being in cooperative work performed by the human being and a robot.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is a table illustrating an example motion program;

DESCRIPTION OF THE EMBODIMENTS

Figure 1:
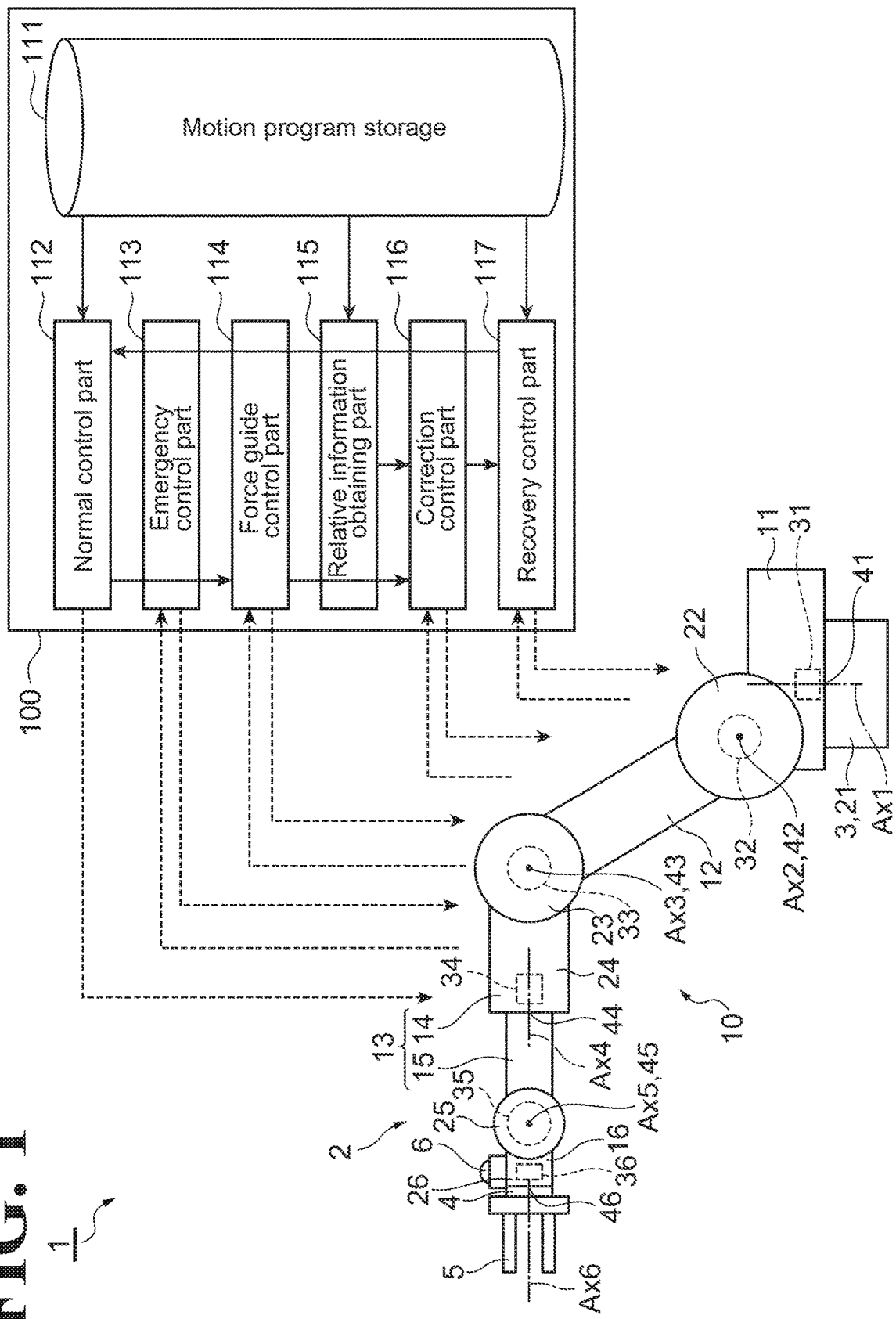
FIG. 1 is a schematic illustrating a configuration of a robot system as a whole.

The embodiments will now be described with reference to the accompanying drawings, wherein like reference numerals designate corresponding or identical elements throughout the various drawings.

Robot System

As illustrated in FIG. 1, a robot system 1 is a human cooperative system, in which a robot 2 and a worker cooperate with each other. The robot system 1 includes the robot 2 and a controller 100.

The robot 2 is a six-axis vertical multi-articular robot, and includes a base 3, a leading end 4, a multi-articular arm 10, a tool 5, and an input switch 6. The base 3 is disposed on the floor of a workspace of the robot 2.

The multi-articular arm 10 connects the base 3 and the leading end 4 to each other. The multi-articular arm 10 includes a plurality of joints, and adjusts the position and the posture of the leading end 4 relative to the base 3 by changing the angles of the plurality of joints. The multi-articular arm 10 includes a turnable part 11, a lower arm 12, an upper arm 13, a wrist 16, actuators 21, 22, 23, 24, 25, and 26, and force sensors 31, 32, 33, 34, 35, and 36.

The turnable part 11 is located at an upper part of the base 3 turnably about vertical axis Ax1. Specifically, the multi-articular arm 10 includes a joint 41. The joint 41 makes the turnable part 11 turnable about the vertical axis Ax1.

The lower arm 12 is connected to the lower arm 12 swingably about axis Ax2, which crosses (for example, is orthogonal to) the vertical axis Ax1. Specifically, the multi-articular arm 10 includes a joint 42. The joint 42 makes the lower arm 12 swingable about the axis Ax2. It is to be noted that the terms "cross", "crosses", and "crossing" encompass a skew relationship such as "grade separation". The same applies in the following description.

The upper arm 13 is connected to an end of the lower arm 12 swingably about axis Ax3, which crosses the vertical axis Ax1. Specifically, the multi-articular arm 10 includes a joint 43. The joint 43 makes the upper arm 13 swingable the axis Ax3. The axis Ax3 may be parallel to the axis Ax2.

The leading end, 15, of the upper arm 13 is turnable about axis Ax4, which extends along the axial center of the upper arm 13. In other words, the leading end 15 of the upper arm 13 is turnable relative to the base end, 14, of the upper arm 13. Specifically, the multi-articular arm 10 includes a joint 44. The joint 44 makes the leading end 15 of the upper arm 13 turnable about the axis Ax4.

The wrist 16 is connected to the leading end 15 of the upper arm 13 swingably about axis Ax5, which crosses (for example, is orthogonal to) the axis Ax4. Specifically, the multi-articular arm 10 includes a joint 45. The joint 45 makes the wrist 16 swingable about the axis Ax5.

The leading end 4 is connected to the leading end of the wrist 16 turnably about axis Ax6, which extends along the axial center of the wrist 16. Specifically, the multi-articular arm 10 includes a joint 46. The joint 46 makes the leading end 4 turnable about the axis Ax6.

The actuators 21, 22, 23, 24, 25, and 26 include electric motors as power sources to drive the respective movable parts of the multi-articular arm 10. Specifically, the actuator 21 makes the turnable part 11 turn about the vertical axis Ax1; the actuator 22 makes the lower arm 12 swing about the axis Ax2; the actuator 23 makes the upper arm 13 swing about the axis Ax3; the actuator 24 makes the leading end 15 of the upper arm 13 turn about the axis Ax4; the actuator 25 makes the wrist 16 swing about the axis Ax5; and the actuator 26 makes the leading end 4 turn about the axis Ax6. More specifically, the actuators 21 to 26 respectively drive the joints 41 to 46. The force sensors 31 to 36 are strain gauge torque sensors and detect torque acting on the respective joints 41 to 46.

The tool 5 is mounted on the leading end 4 and used in work performed by the robot 2. The tool 5 varies in detailed configuration depending on the type of work performed by the robot 2. Examples of the tool 5 include, but are not limited to: a hand to hold workpieces; a driver for screwing purposes; and a welding torch. In FIG. 1 and other drawings, the tool 5 is a hand to hold workpieces.

The input switch 6 is a switch through which the worker who cooperates with the robot 2 inputs various signals into the robot 2. Examples of the signals that can be input through the input switch 6 include, but are not limited to: a guide-on signal, described later; a stop command signal, described later; and a resumption command signal, described later.

It is to be noted that the above-described configuration of the robot 2 is presented for example purposes only, and that the robot 2 may have any other configuration insofar as the robot 2 is capable of adjusting the position and the posture of the leading end 4 relative to the base 3. For example, the robot 2 may be a seven-axis robot equivalent to the above-described six-axis vertical multi-articular robot plus a redundant axis. For further example, the robot 2 may be a SCARA (Selective Compliance Assembly Robot Arm) robot.

The controller 100 performs: normal control that includes controlling the multi-articular arm 10 to move the leading end 4 based on a motion program that specifies a transition over time of a target position and a target posture of the leading end 4 relative to the base 3; force guide control that includes controlling the multi-articular arm 10 to move the leading end 4 in response to a guide manipulation of applying an external force to the robot 2 during the normal control; obtaining relative command information that is based on the target position and the target posture of the leading end 4 at a start point of a correction target section and that specifies the target position and the target posture of the leading end 4 at points of the correction target section including the start point and an end point of the correction target section (the correction target section is a section that is included in the transition and that starts and ends in the transition); performing correction control that includes controlling the multi-articular arm 10 to, based on the relative command information, move the leading end 4 from the position and the posture of the leading end 4 as of the point of time when movement of the multi-articular arm 10 under the force guide control ended.

The controller 100 includes functional configurations (hereinafter referred to as "functional modules"), namely, a motion program storage 111, a normal control part 112, a force guide control part 114, a relative information obtaining part 115, a correction control part 116, a recovery control part 117, and an emergency control part 113.

The motion program storage 111 stores the above-described motion program. The motion program includes a plurality of motion commands aligned in time order. The plurality of motion commands include a motion command for the multi-articular arm 10 and a motion command for the tool 5. The motion command for the multi-articular arm 10 includes a movement command that specifies a target position and a target posture of the leading end 4 relative to the base 3. It is to be noted that at least some movement commands may be described to specify a relative change of the position and the posture of the leading end 4. When a command is described in this manner, this command will be referred to as "relative command". When, in contrast, a command is described to specify a target position and a target posture of the leading end 4 relative to the base 3, this command will be referred to as "absolute command". It is difficult or impossible to specify a target position and a target posture of the leading end 4 relative to the base 3 by relying solely on a relative command. When, however, at least one absolute command is included in the motion program, a target position and a target posture of the leading end 4 relative to the base 3 can be specified using a relative command based on the target position and the target posture specified by the absolute command. When the tool 5 is a hand, the motion command for the tool 5 includes a workpiece holding command and a workpiece releasing command. The motion program may include section specifying information, which specifies the correction target section.

Figure 2:
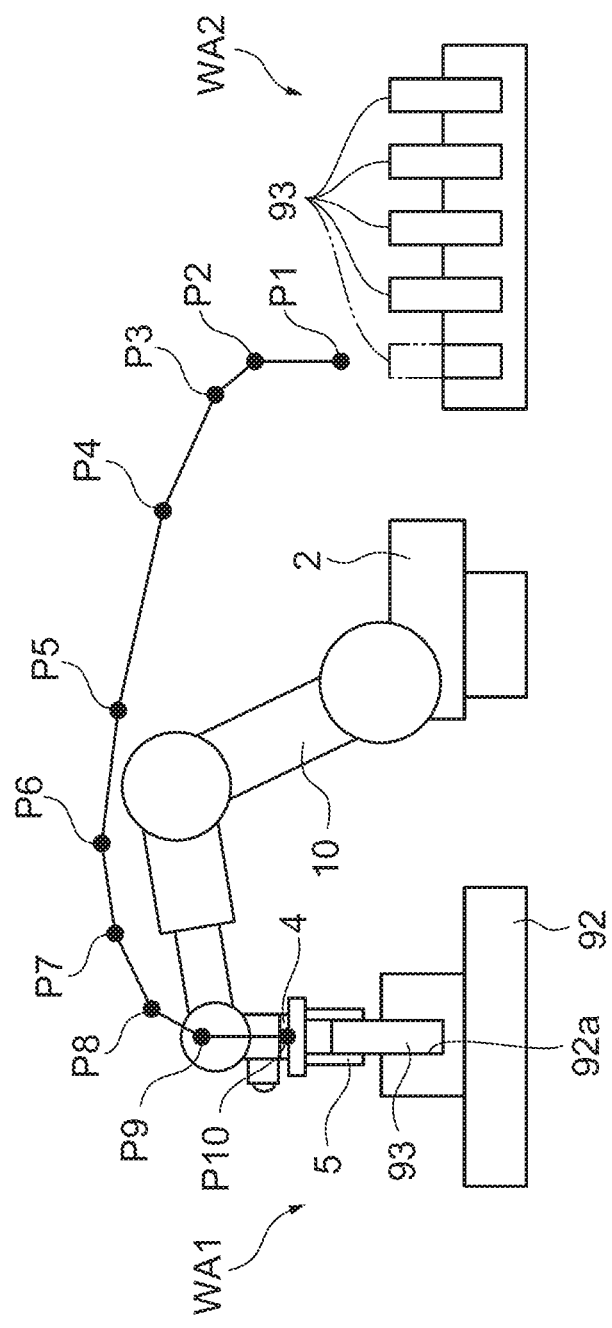
FIG. 2 is a schematic illustrating a robot's motion that is based on a motion program.

FIG. 2 is a schematic illustrating an example motion of the robot 2. As illustrated in FIG. 2, a part 92 is located in an area WA1, and parts 93 are located in an area WA2. The example motion illustrated in FIG. 2 includes transferring a part 93 from the area WA2 to the area WA1 and inserting the transferred part 93 into a hole 92a of the part 92. Point P1 indicates the position of the tool 5 at the time of holding the part 93. Point P9 indicates the position of the tool 5 at the start of insertion of the part 93 into the hole 92a. Point P10 indicates the position of the tool 5 at the time of completion of insertion of the part 93 into the hole 92a. Points P2 to P8 indicate the positions that the tool 5 passes between the points P1 to P9.

FIG. 3 is a table illustrating an example motion program for causing the robot 2 to make the motion illustrated in FIG. 2. Command 001 is a command for moving the tool 5 to the point P1. This movement command includes the target position and the target posture of the leading end 4 at the time of positioning the tool 5 at the point P1. Command 002 is a command for causing the tool 5 to hold the part 93. CommandS003 to 011 are commands for moving the tool 5 respectively to the points P2 to P10. Each of the commandS003 to 011 includes the target position and the target posture of the leading end 4 at the time of positioning the tool 5 at the corresponding destination point. Command 012 is a command for causing the tool 5 to release the part 93. Command 013 is a command for moving the tool 5 to the point P9 after the tool 5 has released the part 93. The command 013 includes the target position and the target posture of the leading end 4 at the time of positioning the tool 5 at the point P9. Command 014 and the commands that follow the command 14 are commands for returning the tool 5 to the area WA2. "Correction target flag" in the table of FIG. 3 corresponds to the above-described section specifying information. The correction target flag is set on an individual command basis, and indicates whether the movement section of the corresponding command is a correction target section. Specifically, "0" indicates that the movement section is not a correction target section, and "1" indicates that the movement section is a correction target section. Specific examples of the above description will be provided below by referring to FIGS. 2 and 3 as necessary.

The normal control part 112 controls the multi-articular arm 10 to move the leading end 4 based on a motion program that specifies a transition over time of the target position and the target posture of the leading end 4 relative to the base 3. This control will be hereinafter referred to as "normal control". For example, in order to move the position and the posture of the leading end 4 relative to the base 3 to a target position and a target posture specified in the motion program, the normal control part 112 derives target motion angles of the joints 41 to 46, and controls the multi-articular arm 10 to follow the motion angles of the joints 41 to 46. The normal control part 112 may control the multi-articular arm 10 to temporarily stop the movement of the leading end 4 while the motion program is being executed.

Timing specifying information specifies a timing at which to temporarily stop the movement of the leading end 4. When the motion program includes the timing specifying information, the normal control part 112 may control the multi-articular arm 10 to temporarily stop the movement of the leading end 4 at the timing specified in the timing specifying information. For example, the normal control part 112 obtains the above-described section specifying information as the timing specifying information, and controls the multi-articular arm 10 to temporarily stop the movement of the leading end 4 immediately before the start of the correction target section. More specifically, the normal control part 112 controls the multi-articular arm 10 to temporarily stop the movement of the leading end 4 immediately before the correction target flag in the table of FIG. 3 changes from 0 to 1 (between the commands 010 and 011).

The force guide control part 114 controls the multi-articular arm 10 to move the leading end 4 in response to a guide manipulation of applying an external force to the robot 2 while the normal control part 112 is controlling the multi-articular arm 10. This control will be hereinafter referred to as "force guide control". In the human-cooperative robot system 1, an external force of guide manipulation is applied to the robot 2 by the worker contacting the robot 2. As used herein, the term "external force" encompasses force and moment, and the terms "move", "movement", and "moving" refer to a change of at least one of position and posture.

For example, in order to move the leading end 4 in the direction in which the external force is being applied, the force guide control part 114 derives a target position and a target posture of the leading end 4; derives target motion angles of the joints 41 to 46 to move the leading end 4 to the target position and target posture that have been derived; and controls the multi-articular min 10 to follow the motion angles of the joints 41 to 46.

The force guide control part 114 may start the force guide control with the movement of the leading end 4 temporarily stopping while the motion program is being executed, and prohibit the force guide control until the movement of the leading end 4 comes to a temporary stop. In the force guide control, the force guide control part 114 may control the multi-articular arm 10 to restrict the movable range of the leading end 4. For example, the force guide control part 114 may restrict the movable range of the position and/or the posture of the leading end 4, or may restrict the movable ranges of the joints 41 to 46. Also, the force guide control part 114 may restrict the time for which to move the leading end 4 in response to the guide manipulation, thereby restricting the movable range of the position and/or the posture of the leading end 4.

In the force guide control, the force guide control part 114 may control the multi-articular arm 10 to restrict the degree of movement freedom of the leading end 4. Examples of how to restrict the degree of movement freedom of the leading end 4 include, but are not limited to: to prevent the posture of the leading end 4 from changing about a predetermined axis; to prevent the leading end 4 from moving along a predetermined axis; and to prevent the posture of the leading end 4 from changing while permitting the position of the leading end 4 to change.

The force guide control part 114 may start the force guide control in response to a guide-on command signal from the worker, and prohibit the force guide control until the guide-on command signal is input. For example, the force guide control part 114 may obtain the guide-on command signal in the form of the state of the input switch 6 as of the period of time for which the movement of the leading end 4 is temporarily stopping. Then, the force guide control part 114 may start the force guide control at the time when the input switch 6 is turned on. It is to be noted that the guide-on command signal will not be limited to the state of the input switch 6. For example, based on a detection result(s) obtained by the force sensors 31 to 36, the force guide control part 114 may detect the worker's manipulation of applying a predetermined external force to the robot 2 (for example, tapping on the robot 2). Upon detection of the manipulation, the force guide control part 114 may start the force guide control.

The force guide control part 114 may perform the force guide control based on information concerning a torque(s) acting on the plurality of joints 41 to 46. Specifically, the force guide control part 114 may derive the above-described external force based on the torque(s) acting on the joints 41 to 46. Then, based on the external force, the force guide control part 114 may control the multi-articular arm 10 to move the leading end 4. The force guide control part 114 may check a detection result(s) obtained by the force sensors 31 to 36 as the information concerning the torque(s) acting on the joints 41 to 46. In another possible embodiment, the force guide control part 114 may check a detection result(s) of deflection angles of the axes of the joints 41 to 46 as the information concerning the torque(s) acting on the joints 41 to 46. The deflection angles are torsion angles calculated based on the rotational angles of the actuators 21 to 26, the reduction ratio of the axis of each joint, and/or the rotational angles of the joints 41 to 46. Although this necessitates two angle sensors per joint axis, it is not necessary to provide the force sensors 31 to 36. In another possible embodiment, the force guide control part 114 may check a torque(s) output from the actuators 21 to 26 as the information concerning the torque(s) acting on the joints 41 to 46. The torque output from the actuators 21 to 26 can be derived based on a current(s) supplied to the actuators 21 to 26.

The relative information obtaining part 115 obtains relative command information from the motion program. The relative command information specifies the target position and the target posture of the leading end 4 at the start point through to the end point of the correction target section. For example, the relative information obtaining part 115 obtains the relative command information based on the section specifying information included in the motion program. Specifically, the relative information obtaining part 115 obtains the relative command information such that the target position and the target posture at the start point correspond to the target position and the target posture as of the time immediately before the correction target flag changes from 0 to 1 (for example, the target position and the target posture corresponding to the command 010 in the table of FIG. 3).

When a motion command in a correction target section is an "absolute command", the relative information obtaining part 115 obtains, as the relative command information, information obtained by subtracting the target position and the target posture at the start point from the target position and the target posture specified by the motion command. When a motion command in a correction target section is a "relative command", the relative information obtaining part 115 obtains the motion command itself as the relative command information.

Based on the relative command information obtained by the relative information obtaining part 115, the correction control part 116 controls the multi-articular arm 10 to move the leading end 4 from the position and the posture of the leading end 4 as of the point of time when the movement of the multi-articular arm 10 under the force guide control ended (this position and this posture may occasionally be referred to as "the position and the posture after the force guide control"). This control will be hereinafter referred to as "correction control".

The correction control part 116 may start the correction control in response to a resumption command signal from the worker. In this case, the resumption command signal may be input from the worker by contacting the robot 2, so that the correction control part 116 may start the correction control in response to the resumption command signal. Specifically, the correction control part 116 may obtain the resumption command signal in the form of the state of the input switch 6 as of the time after the force guide control, and may start the correction control at the time when the input switch 6 is turned on. It is to be noted that the resumption command signal will not be limited to the state of the input switch 6. For example, based on a detection result(s) obtained by the force sensors 31 to 36, the correction control part 116 may detect the worker's manipulation of applying a predetermined external force to the robot 2 (for example, tapping on the robot 2). Upon detection of the manipulation, the correction control part 116 may start the correction control.

the recovery control part 117 controls the multi-articular arm 10 so that the position and the posture of the leading end 4 as of the point of time when the movement of the multi-articular arm 10 controlled by the correction control part 116 ended change to a position and a posture that are specified in the motion program. This control will be hereinafter referred to as "recovery control".

A resistant force may occur against the motions that the robot 2 makes under the control of the normal control part 112, the correction control part 116, and the recovery control part 117. In response to an increase of the resistant force, the emergency control part 113 controls the multi-articular arm 10 to stop a motion against the resistant force. For example, the resistant force can increase when the worker contacts the robot 2. For further example, the resistant force can increase when an arm or another part of the body of the worker has become caught between the components of the robot 2 (for example, between the lower arm 12 and the upper arm 13). An increase of the resistant force is detectable based on a detection result(s) obtained by the force sensors 31 to 36. As used herein, the phrase "stop a motion against the resistant force" not only refers to stopping a motion of the robot 2 but also encompasses moving the robot 2 in the direction in which the resistant force is acting (direction in which the resistant force is alleviated). The motion to "stop a motion against the resistant force" will be hereinafter referred to as "withdrawal motion".

Figure 4:
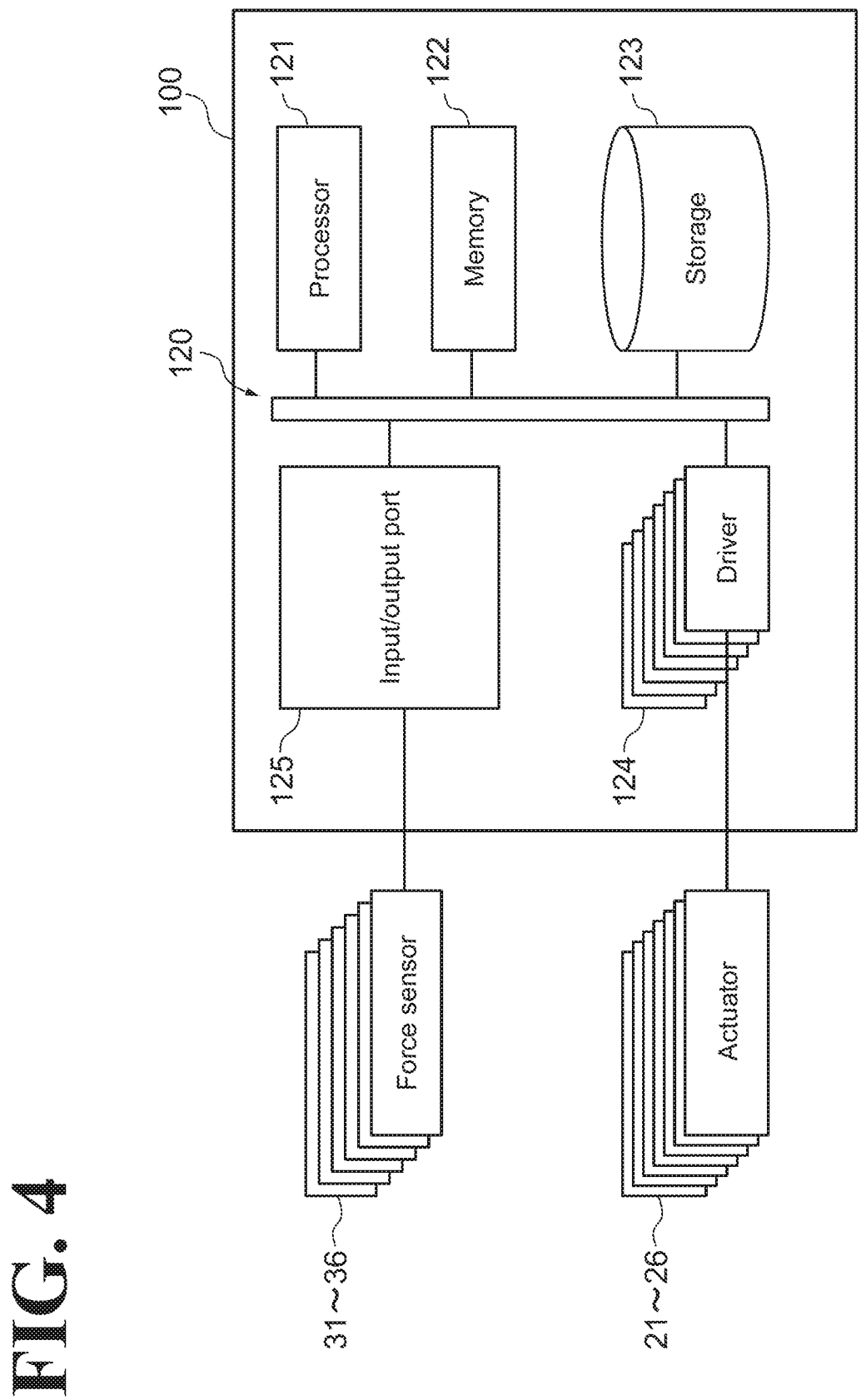
FIG. 4 is a block diagram illustrating a hardware configuration of a controller.

FIG. 4 is a block diagram illustrating a hardware configuration of the controller 100. As illustrated in FIG. 4, the controller 100 includes a circuit 120. The circuit 120 includes at least one processor 121, a memory 122, a storage 123, a driver 124, and an input/output port 125. The storage 123 is a computer-readable non-volatile storage medium (for example, a hard disc or a flash memory). The storage 123 includes a storage area in which programs for implementing the functional modules of the controller 100 are stored; and a storage area assigned to the motion program storage 111. The memory 122 is a temporary storage for programs loaded from the storage 123 and for results of operations performed by the processor 121. The processor 121 cooperates with the memory 122 to execute the programs, thereby implementing the functional modules of the controller 100. The driver 124, at a command from the processor 121, outputs drive power to the motors of the actuators 21 to 26. The input/output port 125, at a command from the processor 121, inputs and outputs electric signals from and to the force sensors 31 to 36.

It is to be noted that the circuit 120 may not necessarily implement the functions using programs. For example, the circuit 120 may implement at least some of the functions using dedicated logic circuits or an application specific integrated circuit (ASIC) in which the dedicated logic circuits are integrated.

It is to be noted that while in the above-described embodiment the single circuit 121 is used to perform the functions of the parts of the controller 100, this configuration is not intended in a limiting sense; it is also possible to use a plurality of circuits to perform the respective functions of the parts of the controller 100.

Procedure for Controlling

An example method for controlling the robot 2 will be described. The example method is performed by the controller 100, and a procedure for control performed by the controller 100 will be described below. This procedure includes performing: normal control that includes controlling the multi-articular arm 10 to move the leading end 4 based on a motion program that specifies a transition over time of a target position and a target posture of the leading end 4 relative to the base 3; force guide control that includes controlling the multi-articular arm 10 to move the leading end 4 in response to a guide manipulation of applying an external force to the robot 2 during the normal control; obtaining relative command information that is based on the target position and the target posture of the leading end 4 at a start point of a correction target section and that specifies the target position and the target posture of the leading end 4 at points of the correction target section including the start point and an end point of the correction target section (the correction target section is a section that is included in the transition and that starts and ends in the transition); performing correction control that includes controlling the multi-articular arm 10 to, based on the relative command information, move the leading end 4 from the position and the posture of the leading end 4 as of the point of time when movement of the multi-articular arm 10 under the force guide control ended.

Figure 5:
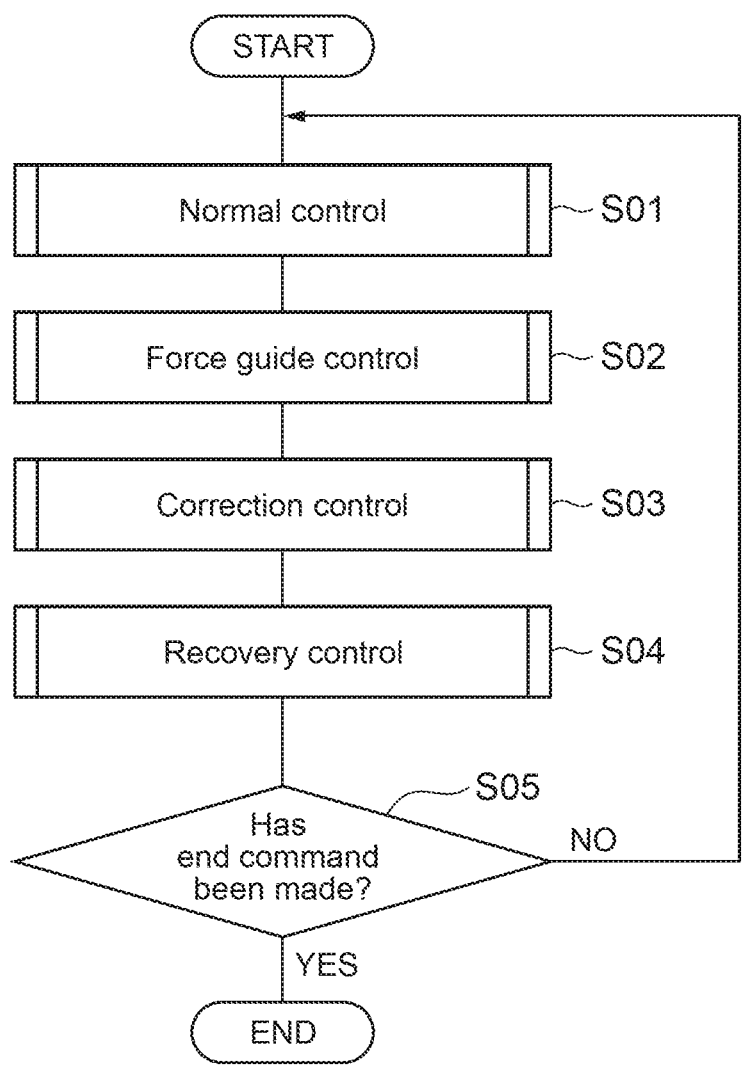
FIG. 5 is a flowchart of an example procedure for controlling the robot.
Figure 12A:
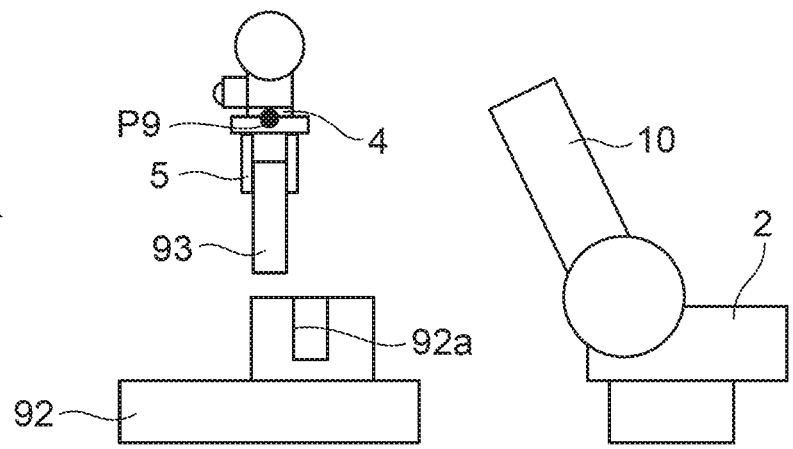
FIGS. 12A, 12B, and 12C are schematics illustrating the robot's example motions that are based on the normal control, the force guide control, and the correction control.
Figure 12B:
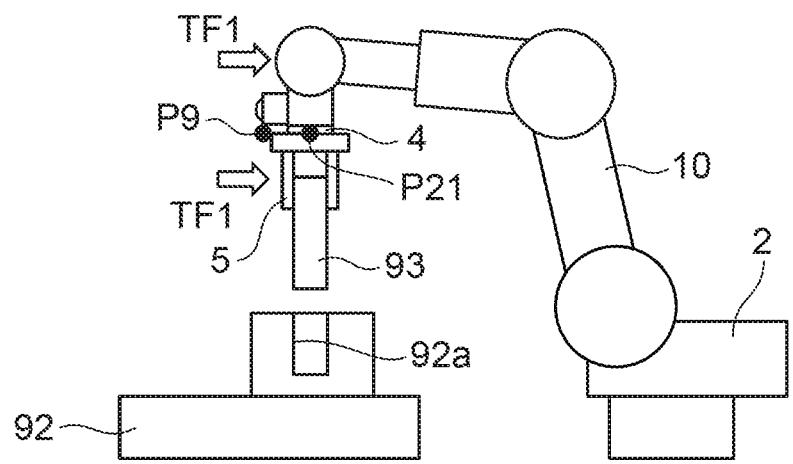

As illustrated in FIG. 5, the controller 100 performs steps S01, S02, S03, and S04. At step S01, the normal control part 112 performs the normal control until the time immediately before the start of the correction target section. Specifically, the normal control part 112 controls the multi-articular arm 10 to temporarily stop the movement of the leading end 4. FIG. 12A illustrates an example in which the movement of the leading end 4 is temporarily stopping with the tool 5 positioned at the point P9. At step S02, the force guide control part 114 performs the force guide control. FIG. 12B illustrates an example in which the leading end 4 has moved from the point P9 to the point P21 in response to a guide manipulation of applying external force TF1 to the robot 2. At step S03, the relative information obtaining part 115 obtains the relative command information, and the correction control part 116 performs the correction control.

Figure 12C:
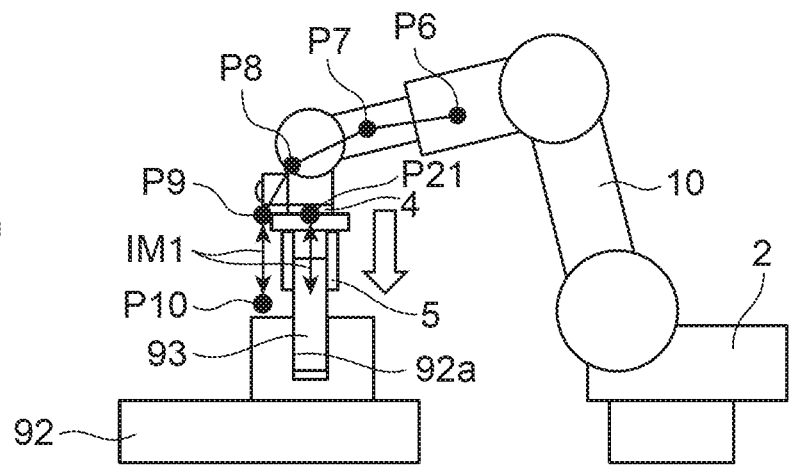

As illustrated in FIG. 12C, the relative information obtaining part 115 obtains information concerning a relative command IM1. The relative command IM1 is for moving the tool 5 from the point P9 to the point P10 and then from the point P10 to the point P9. When the command 011 is described in the absolute command form, the relative information obtaining part 115 obtains, as the information concerning the relative command IM1, information obtained by subtracting the target position and the target posture at the point P9 from the target position and the target posture specified by the command 011. When the command 011 is described in the relative command form, the relative information obtaining part 115 obtains the command 011 itself as the information concerning the relative command IM1.

At step S04, the recovery control part 117 performs the recovery control. As illustrated in FIG. 12C, the recovery control part 117 controls the multi-articular arm 10 to change the position and the posture at the point P21 respectively to the position and the posture at the point P8.

Next, the controller 100 performs step S05. At step S05, the normal control part 112 checks whether there is an end command for ending the control of the robot 2. Upon determining at step S05 that there is no end command, the controller 100 returns the processing to step S01 to perform the normal control, the force guide control, and the correction control again. Upon determining at step S05 that there is an end command, the controller 100 completes the processing.

Procedure for Normal Control

Figure 6:
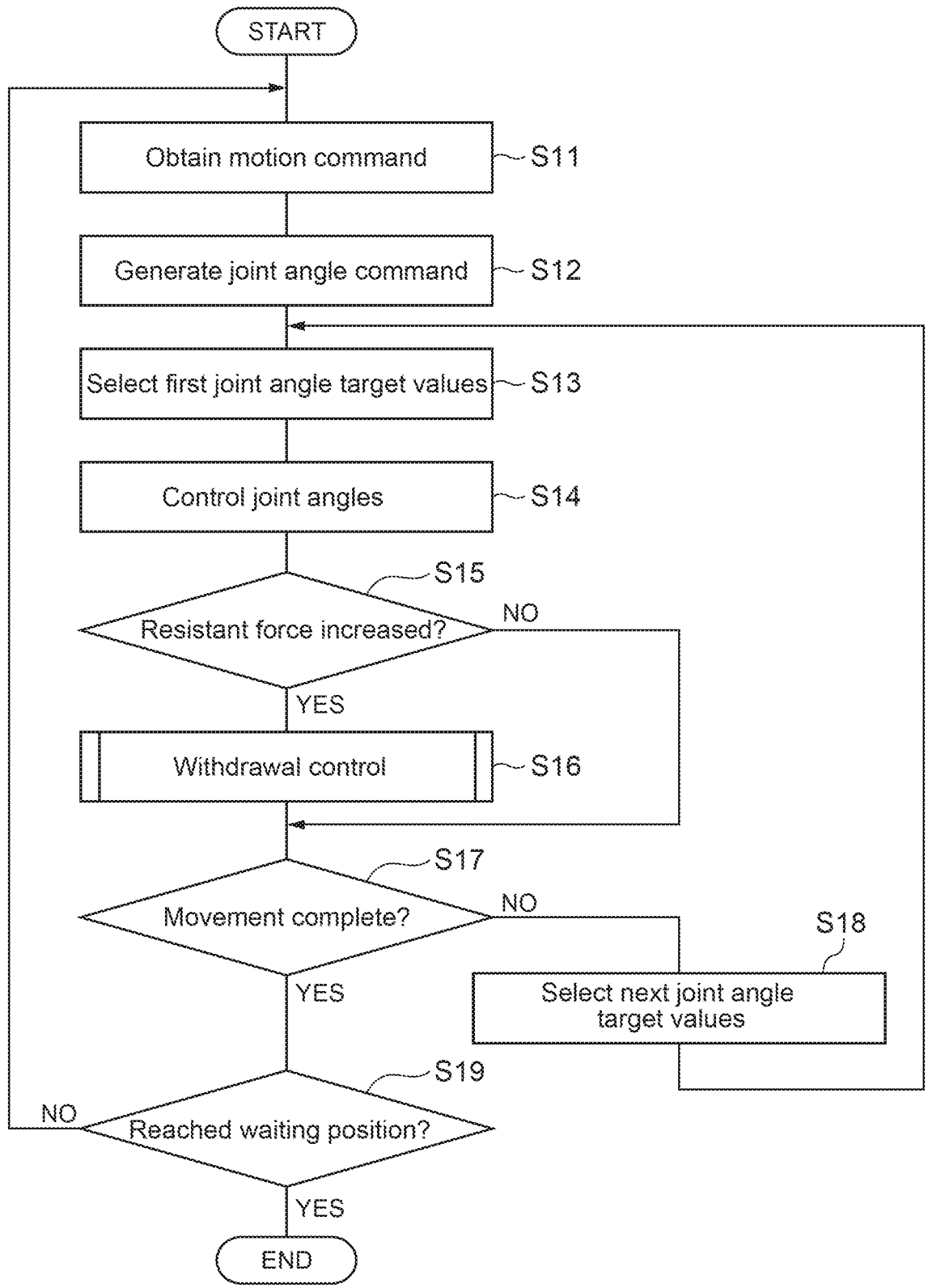
FIG. 6 is a flowchart of an example procedure for normal control.

An example procedure for the normal control performed at step S01 will be described. As illustrated in FIG. 6, the controller 100 first performs steps S11, S12, and S13. At step S11, the normal control part 112 obtains a motion command from the motion program. For example, the normal control part 112 obtains a motion command that is smallest in number among un-executed motion commands in the motion program. At step S12, the normal control part 112 performs an inverse kinematics operation to derive joint angle target values (target values of the motion angles of the joints 41 to 46) for moving the leading end 4 to the target position and the target posture specified by the motion command. When the time over which the motion command is executed is divided into a plurality of control periods, the normal control part 112 performs, for example, linear interpolation to derive joint angle target values on an individual control period basis. At step S13, the normal control part 112 selects the joint angle target values for the first control period.

Next, the controller 100 performs steps S14 and S15. At step S14, the normal control part 112 controls the multi-articular arm 10 to cause the actuators 21 to 26 to drive the joints 41 to 46 based on the respective joint angle target values that have been selected. At step S15, the emergency control part 113 checks whether the resistant force has increased.

Upon determining at step S15 that the resistant force has increased, the controller 100 performs step S16. At step S16, the emergency control part 113 performs the withdrawal control. Details of the withdrawal control will be described later.

Next, the controller 100 performs step S17. Upon determining at step S16 that the resistant force has not increased, the controller 100 performs step S17 without performing step S16. At step S17, the normal control part 112 checks whether the movement of the leading end 4 based on the motion command is complete. For example, the normal control part 112 checks whether the motion command has been executed in all the control periods.

Upon determining at step S17 that the motion command has not been executed in all the control periods, the controller 100 performs step S18. At step S18, the normal control part 112 selects the joint angle target values for the next control period. Then, the controller 100 returns the processing to step S14 to control again the leading end 4 to move based on the motion command while checking whether the resistant force has increased.

Upon determining at step S17 that the motion command has been executed in all the control periods, the controller 100 performs step S19. At step S19, the normal control part 112 checks whether the leading end 4 has reached a wait position for the guide manipulation. The wait position for the guide manipulation is the target position and the target posture of the leading end 4 specified by the motion command immediately before the start of the correction target section (for example, the target position and the target posture specified by the command 010 in the table of FIG. 3).

Figure 14:
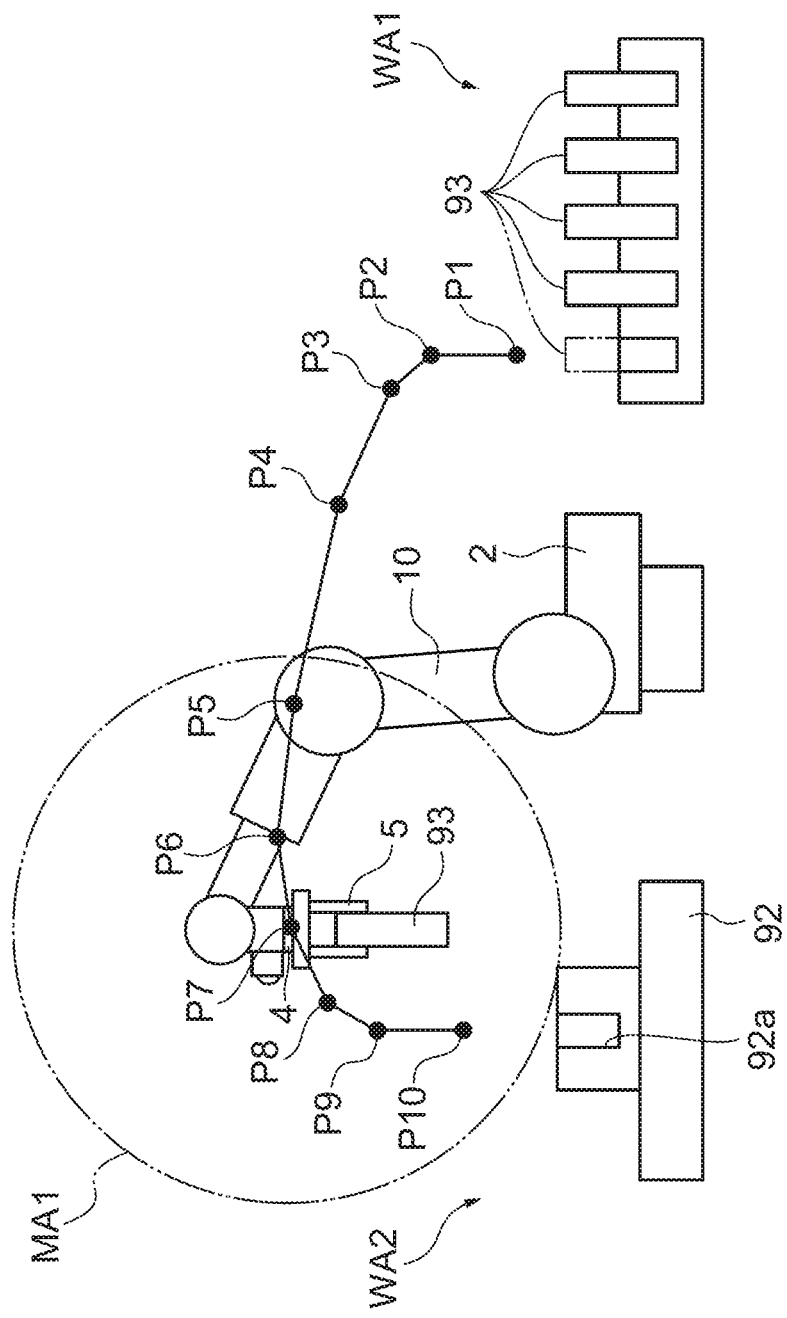
FIG. 14 is a schematic illustrating a relationship between a stopping position and a correction target section.

Upon determining at step S19 that the leading end 4 has not reached the wait position, the controller 100 returns the processing to step S11 to repeat the normal control until the leading end 4 reaches the wait position. Upon determining at step S19 that the leading end 4 has reached the wait position, the controller 100 completes the normal control. This causes the movement of the leading end 4 to temporarily stop. It is to be noted that the wait position may not necessarily be the target position and the target posture of the leading end 4 specified by the motion command immediately before the start of the correction target section. For example, the wait position may be the target position and the target posture of the leading end 4 specified by a motion command that is two or more levels previous to the correction target section. In this case, the wait position may be set at a position and a posture that include the target position and the target posture of the leading end 4 at the start point of the correction target section in the movable range of the leading end 4. In the example illustrated in FIG. 14, the wait position is the target position and the target posture of the leading end 4 specified by the command 008 (position corresponding to the point P7), which is three levels previous to the correction target section. In this case, the target position and the target posture of the leading end 4 at the start point of the correction target section (position corresponding to the point P9) is included in the movable range MA1 in relation to the wait position.

The normal control part 112 may also control the multi-articular arm 10 to temporarily stop the movement of the leading end 4 in response to a stop command signal from the worker. In this case, the normal control part 112 may obtain the state of the input switch 6 as the stop command signal, and control the multi-articular arm 10 to temporarily stop the movement of the leading end 4 at the time when the input switch 6 is turned on.

Figure 7:
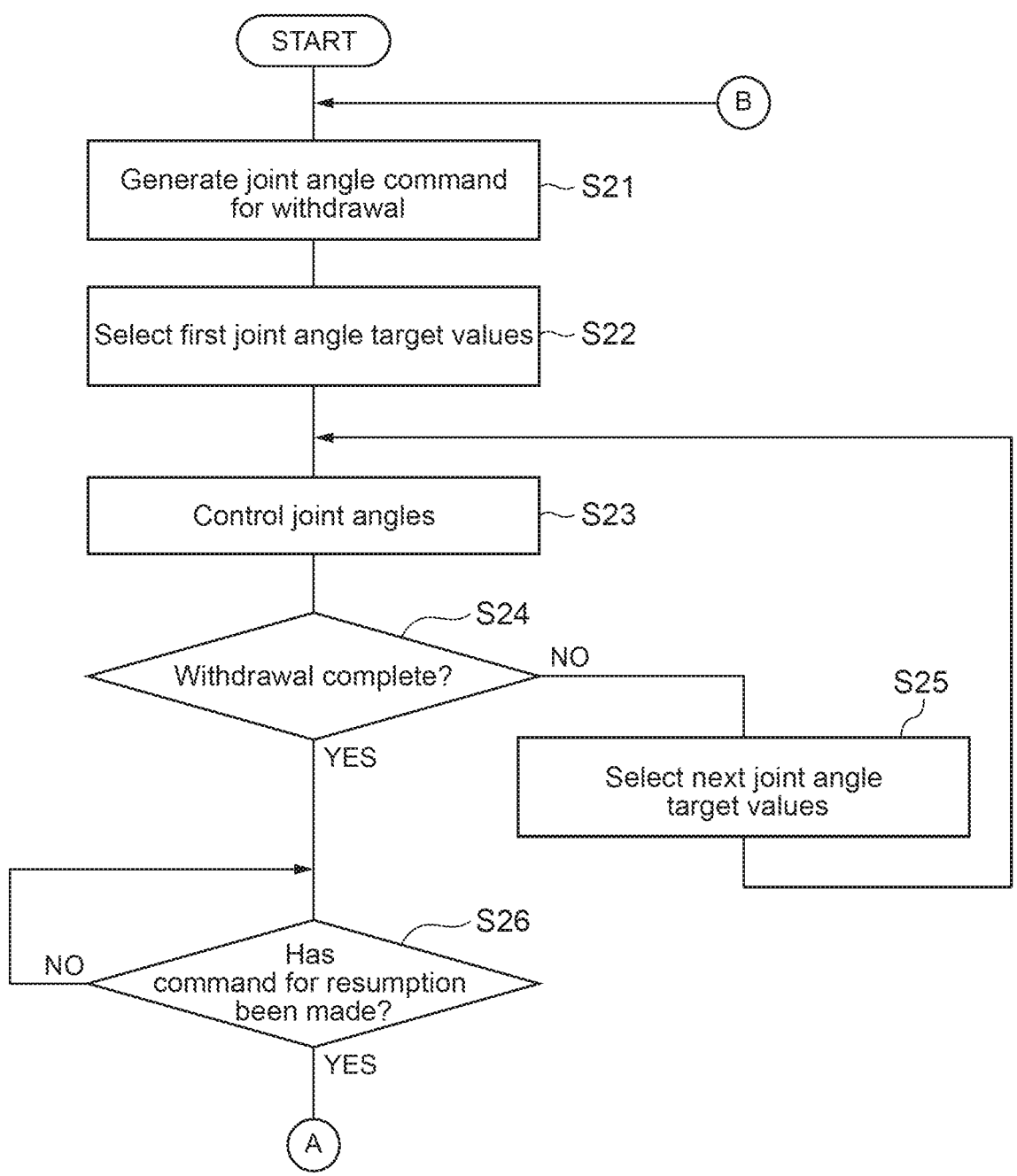
FIG. 7 is a flowchart of an example procedure for withdrawal control.

An example procedure for the withdrawal control performed at step S16 will be described. As illustrated in FIG. 7, the controller 100 first performs steps S21, S22, and S23. At step S21, the emergency control part 113 derives joint angle target values for alleviating the resistant force. The posture of the robot 2 corresponding to the derived joint angle target values will be hereinafter referred to as "withdrawal posture". For example, the emergency control part 113 derives joint angle target values of the joints 41 to 46 for alleviating the torques detected by the force sensors 31 to 36. When the time over which the withdrawal control is performed is divided into a plurality of control periods, the emergency control part 113 performs, for example, linear interpolation to derive joint angle target values on an individual control period basis. At step S22, the emergency control part 113 selects the joint angle target values for the first control period. At step S23, the emergency control part 113 controls the multi-articular arm 10 to cause the actuators 21 to 26 to drive the joints 41 to 46 based on the respective joint angle target values that have been selected.

Next, the controller 100 performs step S24. At step S24, the emergency control part 113 checks whether the posture of the robot 2 is the withdrawal posture. Upon determining at step S24 that the posture of the robot 2 is not the withdrawal posture, the controller 100 performs step S25. At step S25, the normal control part 112 selects the joint angle target values for the next control period. Then, the controller 100 returns the processing to step S23 to repeatedly change the posture of the robot 2 until the posture of the robot 2 becomes the withdrawal posture.

Figure 13A:
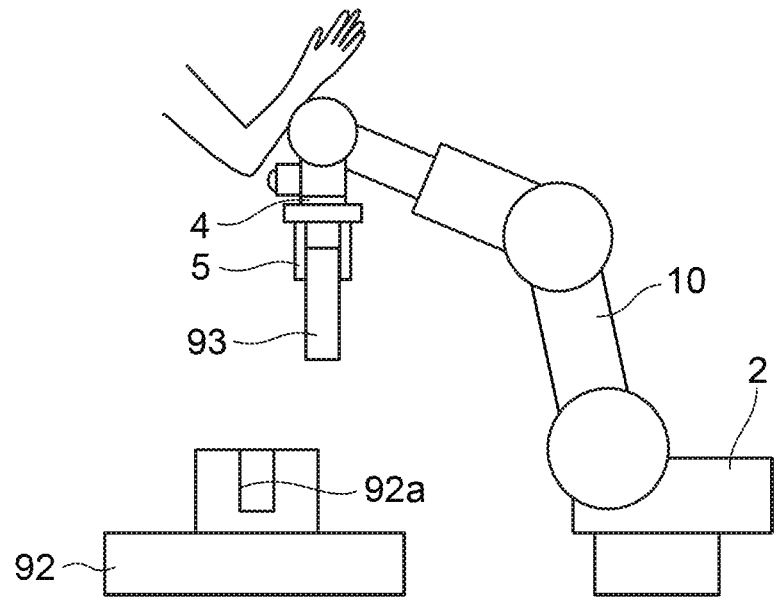
FIGS. 13A and 13B are schematics illustrating the robot's example motions that are based on the withdrawal control.
Figure 13B:
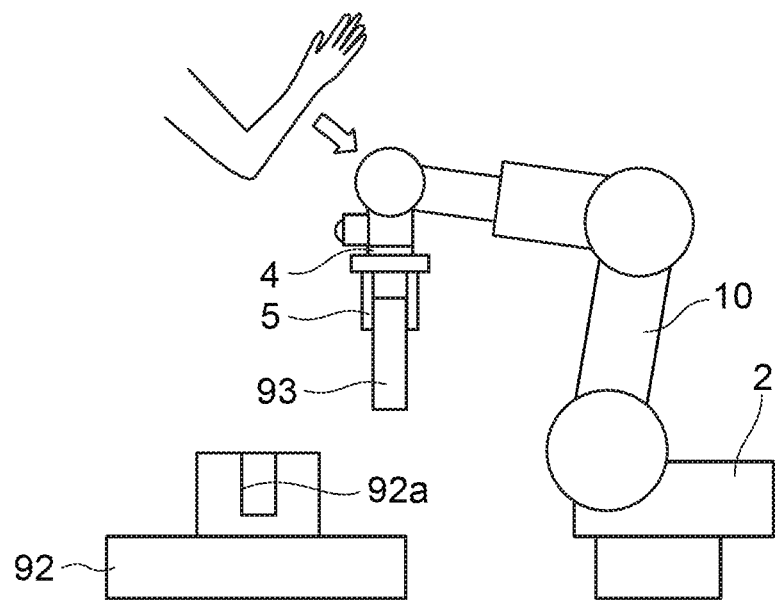

FIG. 13A illustrates an example in which an arm of the worker contacts the robot 2 during the movement of the tool 5 from the point P7 to the point P8. In this case, by changing the joint angle target values of the joints 41 to 46 in a manner that alleviates the torques detected by the force sensors 31 to 36, the withdrawal posture of the robot 2 is set at such a posture that is farther away from the arm of the worker (see FIG. 13B).

Upon determining at step S24 that the posture of the robot 2 is the withdrawal posture, the controller 100 performs step S26. At step S26, the emergency control part 113 waits for the resumption command to be input. For example, the emergency control part 113 obtains the state of the input switch 6 as the resumption command signal, and waits for the input switch 6 to be turned on.

Figure 8:
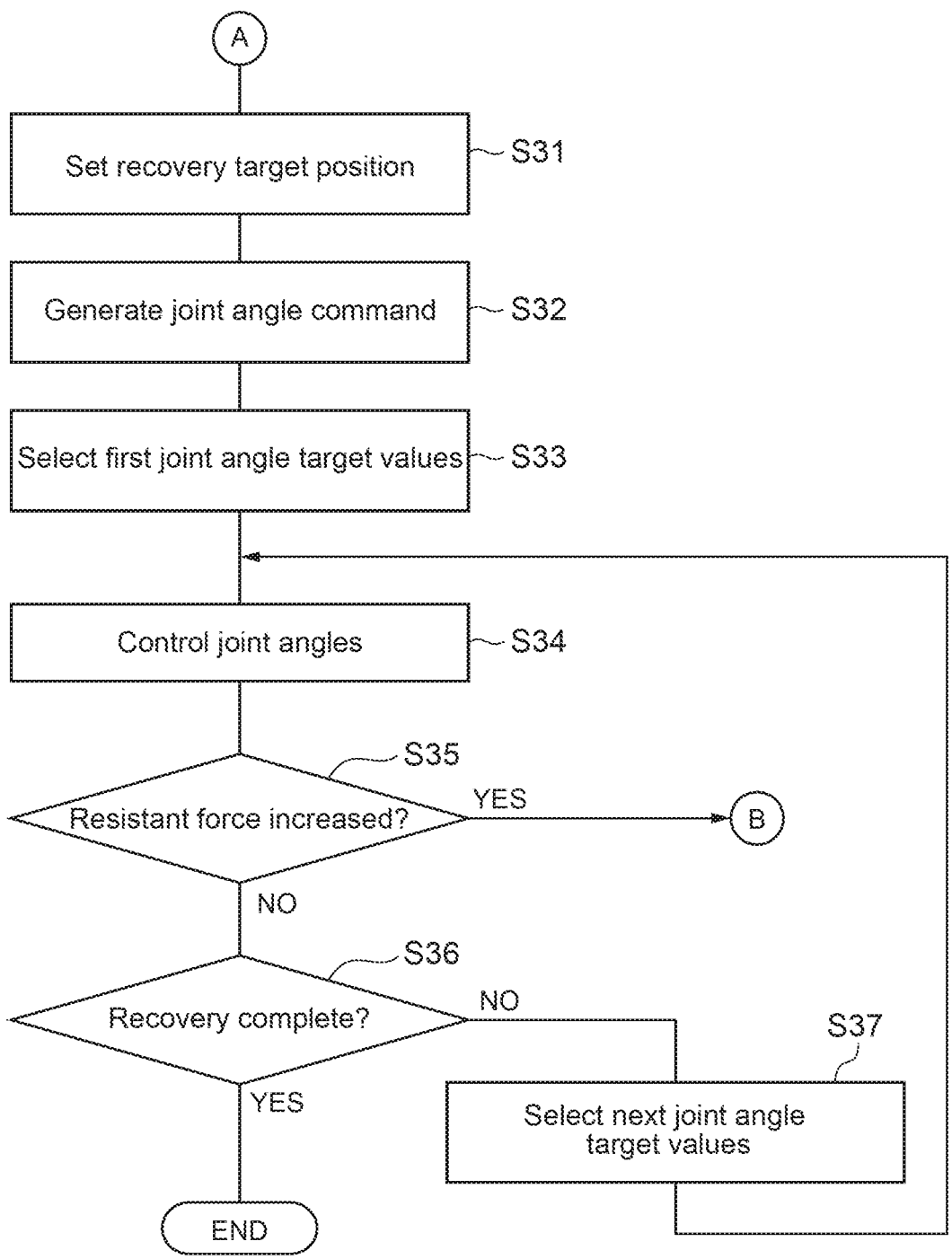
FIG. 8 is a flowchart of an example procedure for the withdrawal control.

Next, the controller 100 performs steps S31, S32, S33, S34, and S35, as illustrated in FIG. 8. At step S31, the emergency control part 113 sets a recovery target position. For example, the emergency control part 113 sets the recovery target position at the position and the posture of the leading end 4 as of the time immediately before the posture of the robot 2 starts changing to the withdrawal posture. At step S32, the emergency control part 113 performs an inverse kinematics operation to derive joint angle target values (target values of the motion angles of the joints 41 to 46) for moving the leading end 4 to the recovery target position. When the time over which the recovery to the recovery target position is performed is divided into a plurality of control periods, the emergency control part 113 performs, for example, linear interpolation to derive joint angle target values on an individual control period basis. At step S33, the emergency control part 113 selects the joint angle target values for the first control period. At step S34, the emergency control part 113 controls the multi-articular arm 10 to cause the actuators 21 to 26 to drive the joints 41 to 46 based on the respective joint angle target values that have been selected. At step S35, the emergency control part 113 checks whether the resistant force has increased.

Upon determining at step S35 that the resistant force has increased, the controller 100 returns the processing to step S21. Upon determining at step S35 that the resistant force has not increased, the controller 100 performs step S36. At step S36, the emergency control part 113 checks whether the movement of the leading end 4 to the recovery target position is complete.

Upon determining at step S36 that the movement of the leading end 4 is not complete, the controller 100 performs step S37. At step S37, the emergency control part 113 selects the joint angle target values for the next control period. Then, the controller 100 returns the processing to step S34 to repeatedly move the leading end 4 until the leading end 4 moves to the recovery target position. Upon determining at step S36 that the movement of the leading end 4 is complete, the controller 100 completes the withdrawal control.

Procedure for Force Guide Control

Figure 9:
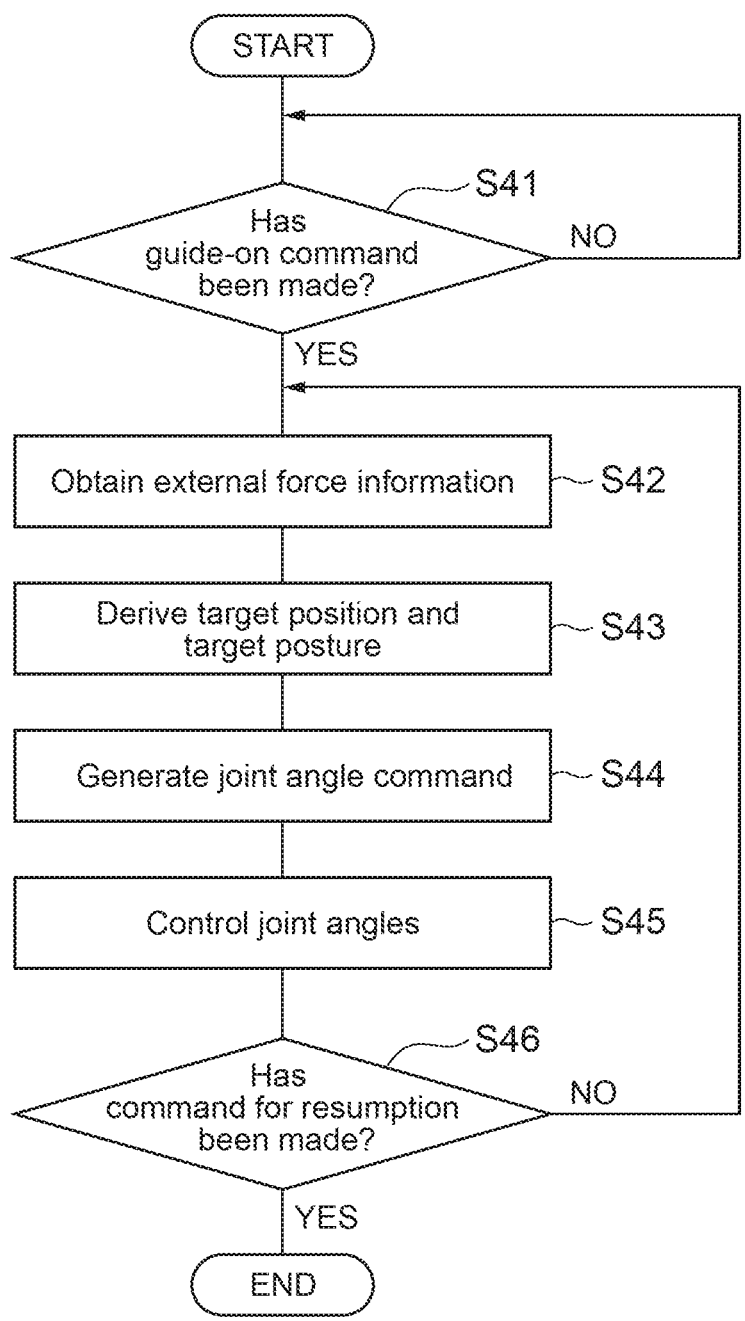
FIG. 9 is a flowchart of an example procedure for force guide control.

An example procedure for the force guide control performed at step S02 will be described. As illustrated in FIG. 9, the controller 100 first performs step S41. At step S41, the force guide control part 114 waits for the guide-on command to be input. For example, the force guide control part 114 obtains the guide-on command signal in the form of the state of the input switch 6 as of the period of time for which the movement of the leading end 4 is temporarily stopping. The force guide control part 114 waits for the input switch 6 to be turned on.

Next, the controller 100 performs steps S42, S43, S44, and S45. At step S42, the force guide control part 114 obtains, as the guide manipulation, information concerning the external force that has been input. For example, the force guide control part 114 obtains a detection result(s) obtained by the force sensors 31 to 36. At step S43, the force guide control part 114 derives the target position and the target posture of the leading end 4 that are based on the external force (this target position and this target posture will be hereinafter referred to as "guide target position"). For example, based on the detection result(s) obtained by the force sensors 31 to 36, the force guide control part 114 derives a force and a moment acting on the leading end 4. Then, based on the force and the moment, the force guide control part 114 derives a target position and a target posture of the leading end 4. At step S44, the force guide control part 114 performs an inverse kinematics operation to derive joint angle target values (target values of the motion angles of the joints 41 to 46) for moving the leading end 4 to the guide target position. At step S45, the force guide control part 114 controls the multi-articular arm 10 to cause the actuators 21 to 26 to drive the joints 41 to 46 based on the respective joint angle target values.

Next, the controller 100 performs step S46. At step S46, the correction control part 116 checks whether the resumption command signal has been input. Specifically, the correction control part 116 obtains the resumption command signal in the form of the state of the input switch 6 as of the time after the force guide control, and checks whether the input switch 6 is on. Upon determining at step S46 that the resumption command signal has not been input, the controller 100 returns the processing to step S42 to repeat the force guide control until the resumption command signal is input. Upon determining at step S46 that the resumption command signal has been input, the controller 100 completes the force guide control.

Procedure for Correction Control

Figure 10:
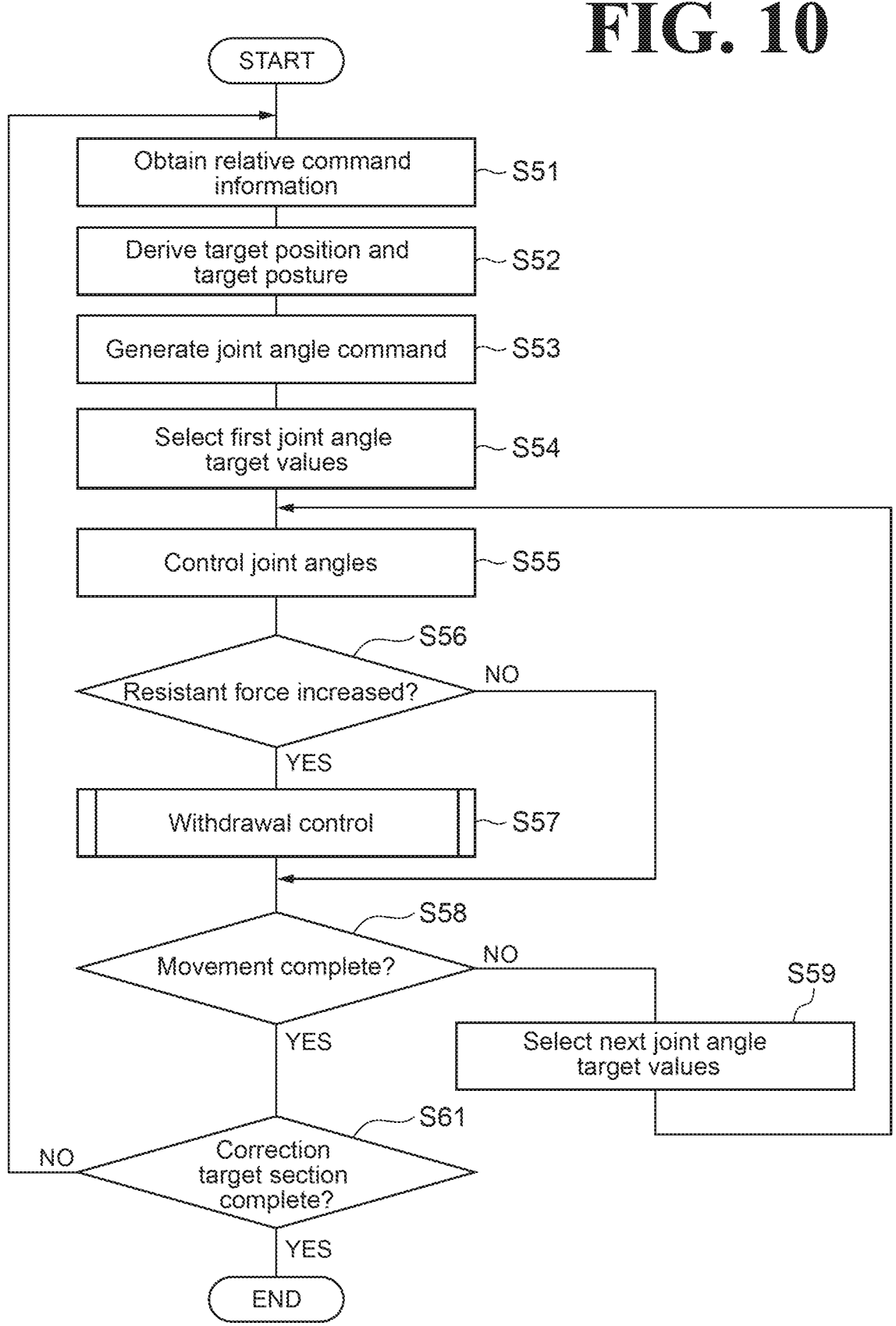
FIG. 10 is a flowchart of an example procedure for correction control.

An example procedure for the correction control performed at step S03 will be described. As illustrated in FIG. 10, the controller 100 first performs steps S51 and S52. At step S51, the relative information obtaining part 115 obtains the relative command information. When the command O11 is described in the absolute command form, the relative information obtaining part 115 obtains, as the information concerning the relative command IM1, information obtained by subtracting the target position and the target posture at the point P9 from the target position and the target posture specified by the command O11. When the command O11 is described in the relative command form, the relative information obtaining part 115 obtains the command O11 itself as the information concerning the relative command IM1. At step S52, the correction control part 116 derives, based on the current position and the current posture of the leading end 4, a target position and a target posture that the leading end 4 would take when the relative command information were taken into consideration (this target position and this target posture will be hereinafter referred to as "correction target position"). When a motion command corresponding to the relative command information is the first motion command in the correction target section, the current position and the current posture of the leading end 4 respectively correspond to the position and the posture of the leading end 4 as of the point of time when the movement of the robot 2 under the force guide control ended.

Next, the controller 100 performs steps S53, S54, and S55. At step S53, the correction control part 116 performs an inverse kinematics operation to derive joint angle target values (target values of the motion angles of the joints 41 to 46) for moving the leading end 4 to the correction target position. When the time over which the leading end 4 is moved to the correction target position is divided into a plurality of control periods, the correction control part 116 performs, for example, linear interpolation to derive joint angle target values on an individual control period basis. At step S54, the correction control part 116 selects the joint angle target values for the first control period. At step S55, the correction control part 116 controls the multi-articular arm 10 to cause the actuators 21 to 26 to drive the joints 41 to 46 based on the respective joint angle target values that have been selected.

Next, the controller 100 performs step S56. At step S56, the emergency control part 113 checks whether the resistant force has increased. Upon determining that the resistant force has increased, the controller 100 performs step S57. At step S57, the emergency control part 113 performs the withdrawal control, similarly to step S16.

Next, the controller 100 performs step S58. Upon determining at step S56 that the resistant force has not increased, the controller 100 performs step S58 without performing step S57. At step S58, the correction control part 116 checks whether the movement of the leading end 4 to the correction target position is complete. For example, the correction control part 116 checks whether the motion command has been executed in all the control periods to move the leading end 4 to the correction target position.

Upon determining at step S58 that the motion command has not been executed in all the control periods, the controller 100 performs step S59. At step S59, the correction control part 116 selects the joint angle target values for the next control period. Then, the controller 100 returns the processing to step S55 to repeatedly move the leading end 4 to the correction target position while checking whether the resistant force has increased.

Upon determining at step S58 that the movement of the leading end 4 is complete, the controller 100 performs step S61. At step S61, the correction control part 116 checks whether the correction control is complete in all the motion commands in the correction target section. Upon determining at step S61 that the correction control is not complete in all the motion commands, the controller 100 returns the processing to step S51 to repeat the correction control until the correction control is complete in all the motion commands in the correction target section. Upon determining at step S61 that the correction control is complete in all the motion commands, the controller 100 completes the correction control.

Procedure for Recovery Control

Figure 11:
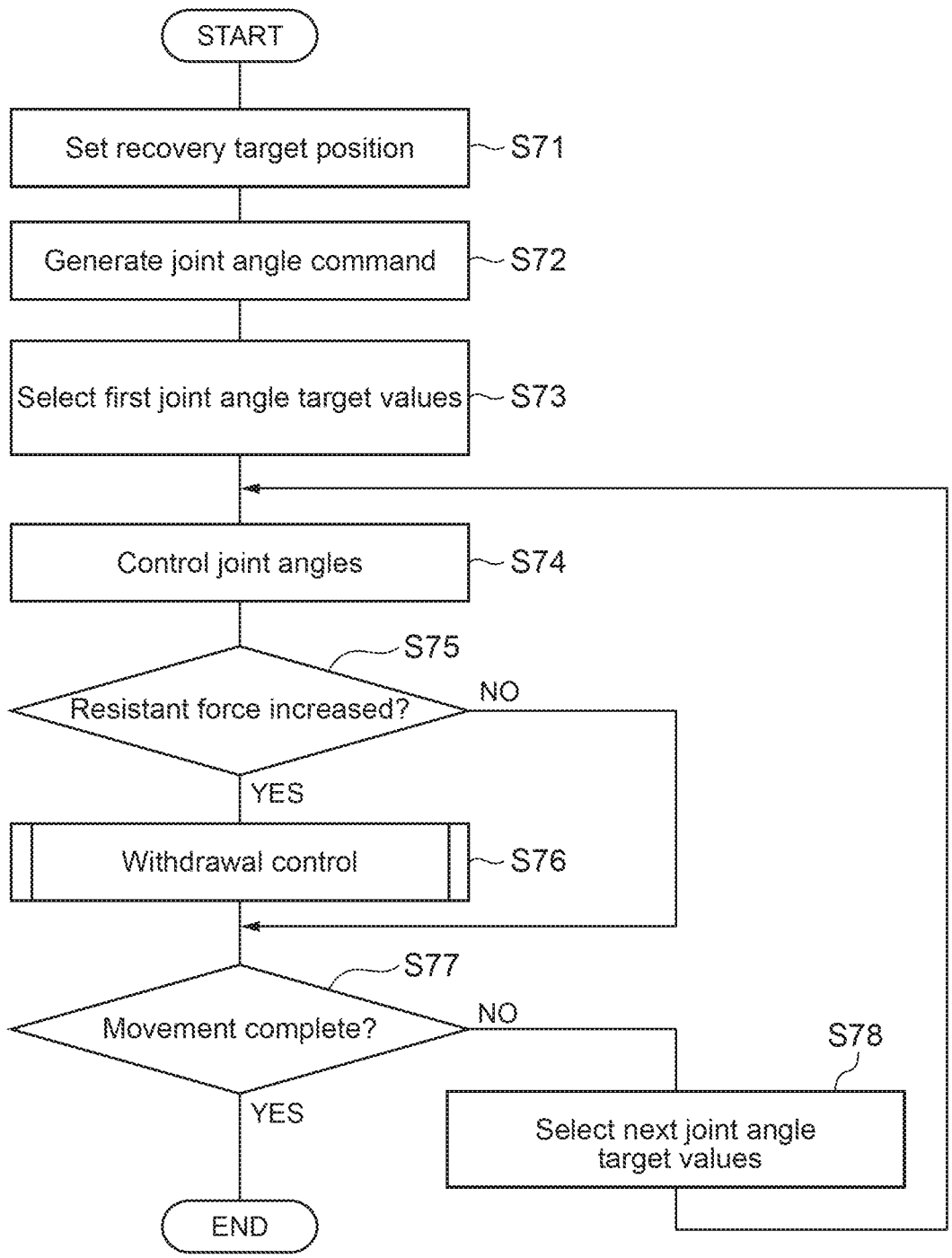
FIG. 11 is a flowchart of an example procedure for recovery control.

An example procedure for the recovery control performed at step S04 will be described. As illustrated in FIG. 11, the controller 100 first performs steps S71, S72, S73, and S74. At step S71, the recovery control part 117 sets a target position and a target posture of the leading end 4 at which to resume the normal control (this target position and this target posture will be hereinafter referred to as "recovery target position"). For example, the recovery control part 117 sets the recovery target position at the target position and the target posture of the leading end 4 specified by the motion command immediately after the correction target section. At step S72, the recovery control part 117 performs an inverse kinematics operation to derive joint angle target values (target values of the motion angles of the joints 41 to 46) for moving the leading end 4 to the recovery target position. When the time over which the leading end 4 is moved to the recovery target position is divided into a plurality of control periods, the recovery control part 117 performs, for example, linear interpolation to derive joint angle target values on an individual control period basis. At step S73, the recovery control part 117 selects the joint angle target values for the first control period. At step S74, the recovery control part 117 controls the multi-articular arm 10 to cause the actuators 21 to 26 to drive the joints 41 to 46 based on the respective joint angle target values that have been selected.

Next, the controller 100 performs step S75. At step S75, the emergency control part 113 checks whether the resistant force has increased. Upon determining at step S75 that the resistant force has increased, the controller 100 performs step S76. At step S76, the emergency control part 113 performs the withdrawal control, similarly to step S16.

Next, the controller 100 performs step S77. Upon determining at step S75 that the resistant force has not increased, the controller 100 performs step S77 without performing step S76. At step S77, the recovery control part 117 checks whether the movement of the leading end 4 to the recovery target position is complete. For example, the recovery control part 117 checks whether the motion command has been executed in all the control periods to move the leading end 4 to the recovery target position.

Upon determining at step S77 that the movement of the leading end 4 is not complete, the controller 100 performs step S78. At step S78, the recovery control part 117 selects the joint angle target values for the next control period. Then, the controller 100 returns the processing to step S74 to repeatedly control the leading end 4 to move to the recovery target position while checking whether the resistant force has increased. Upon determining at step S77 that the movement of the leading end 4 is complete, the controller 100 completes the recovery control.

Advantageous Effects of the Embodiment

As has been described hereinbefore, the robot system 1 includes the robot 2, the normal control part 112, the force guide control part 114, the relative information obtaining part 115, and the correction control part 116. The robot 2 includes the leading end 4, the base 3, and the multi-articular arm 10. The multi-articular arm 10 adjusts the position and the posture of the leading end 4 relative to the base 3. The normal control part 112 controls the multi-articular arm 10 to move the leading end 4 based on a motion program that specifies a transition over time of a target position and a target posture of the leading end 4 relative to the base 3. The force guide control part 114 controls the multi-articular arm 10 to move the leading end 4 in response to a guide manipulation of applying an external force to the robot 2 while the normal control part 112 is controlling the multi-articular arm 10. The relative information obtaining part 115 obtains relative command information that is based on the target position and the target posture of the leading end 4 at a start point of a correction target section and that specifies the target position and the target posture of the leading end 4 at points of the correction target section including the start point and an end point of the correction target section (the correction target section is a section that is included in the transition and that starts and ends in the transition). The correction control part 116 controls the multi-articular arm 10 to, based on the relative command information, move the leading end 4 from the position and the posture of the leading end 4 as of the point of time when movement of the multi-articular arm 10 controlled by the force guide control part 114 ended.

For robots to repeat highly accurate work based on motion programs, it is necessary for robots to work in unchanging work environments. In actual situations, however, robots may occasionally work in varied work environments (hereinafter referred to as "actual environment"). For example, workpieces may be arranged at varied positions and/or postures. In light of the circumstances, the robot system 1 according to this embodiment includes the force guide control part 114. The force guide control part 114 is capable of allowing the worker to perform a guide manipulation of applying an external force to the robot 2 while the robot 2 is working on a workpiece. In this manner, the force guide control part 114 makes the position and the posture of the leading end 4 adapted to the actual environment. Further, the robot system 1 includes the correction control part 116. The correction control part 116 controls the robot 2 to perform the rest of the work based on the position and the posture of the leading end 4 adapted to the actual environment. Thus, the robot system 1 is effective for saving labor of human beings in cooperative work of human beings and robots.

The motion program may include section specifying information that specifies the correction target section. The relative information obtaining part 115 may obtain the relative command information based on the section specifying information. Thus, the target section to be controlled by the correction control part is specified in advance in the motion program. This eliminates or minimizes such a situation that relative command information concerning an irrelevant target section is obtained. This, in turn, prevents the robot 2 from performing erroneous work.

The robot system 1 may further include the recovery control part 117. The recovery control part 117 controls the multi-articular arm 10 so that the position and the posture of the leading end 4 as of the point of time when the movement of the multi-articular arm 10 controlled by the correction control part 116 ended change to a position and a posture that are specified in the motion program. This prevents the discrepancy between the motion program and the position and the posture of the leading end 4 from increasing through repeated control of the correction control part 116. This, in turn, eliminates or minimizes degradation of reliability of the work performed by the robot 2.

The normal control part 112 may control the multi-articular arm 10 to temporarily stop the movement of the leading end 4 while the motion program is being executed. With the movement of the leading end 4 temporarily stopping, the force guide control part 114 may start controlling the multi-articular arm 10 to move the leading end 4 in response to the guide manipulation. Temporarily stopping the motion of the robot 2 facilitates the guide manipulation.

The motion program may include timing specifying information that specifies a timing to temporarily stop the leading end 4. The normal control part 112 may control the multi-articular arm 10 to temporarily stop the movement of the leading end 4 at the timing specified in the timing specifying information. Thus, a timing at which to temporarily stop the leading end 4 is specified in advance in the motion program.

This stabilizes the position to start the guide manipulation. This, in turn, more reliably saves the worker the load associated with the guide manipulation.

When the force guide control part 114 controls the multi-articular arm 10 to move the leading end 4 in response to the guide manipulation, the force guide control part 114 may restrict the movable range of the leading end 4. The normal control part 112 may control the multi-articular arm 10 to temporarily stop the leading end 4 with the leading end 4 taking a position and a posture such that the target position and the target posture of the leading end 4 at the start point of the correction target section are included in the movable range. By restricting the movable range of the leading end 4, an erroneous guide manipulation is eliminated or minimized. Also, restricting the movable range of the leading end 4 prevents the movable range from becoming excessively small in correcting the position and the posture on which the relative command information is based.

When the force guide control part 114 controls the multi-articular arm 10 to move the leading end 4 in response to the guide manipulation, the force guide control part 114 may control the multi-articular atm 10 to restrict the movable range of the leading end 4. By restricting the movable range of the leading end 4, an erroneous guide manipulation is eliminated or minimized.

When the force guide control part 114 controls the multi-articular arm 10 to move the leading end 4 in response to the guide manipulation, the force guide control part 114 may control the multi-articular arm 10 to restrict the degree of movement freedom of the leading end 4. By restricting the degree of movement freedom of the leading end 4, an erroneous guide manipulation is eliminated or minimized.

In response to a resumption command signal from the worker, the correction control part 116 may start controlling the multi-articular arm 10 to move the leading end 4 based on the relative command information. This eliminates or minimizes such a situation that the correction control part 116 controls the multi-articular arm 10 at a timing unexpected for the worker.

In response to a guide-on command signal from the worker, the force guide control part 114 may start controlling the multi-articular arm 10 to move the leading end 4 in response to the guide manipulation. This eliminates or minimizes such a situation that the force guide control part 114 controls the multi-articular arm 10 at a timing unexpected for the worker.

In response to a stop command signal from the worker, the normal control part 112 may control the multi-articular arm 10 to temporarily stop the leading end 4 while the motion program is being executed. Thus, the movement of the leading end 4 can be temporarily stopped at a position desirable for the worker. This provides the worker with improved comfort in performing the guide manipulation.

In response to a resumption command signal from the worker by contacting the robot (2), the correction control part 116 may start controlling the multi-articular arm 10 to move the leading end 4 based on the relative command information. This ensures that the work performed by the robot 2 is resumed quickly after the guide manipulation made by the worker.

The robot system 1 may further include the emergency control part 113, in response to an increase of a resistant force against a motion of the robot 2 controlled by the normal control part 112, the emergency control part 113 controls the multi-articular arm 10 to stop the motion, which is against the resistant force.

The robot 2 may include a plurality of joints 41 to 46. Based on information concerning a torque acting on the plurality of joints 41 to 46, the force guide control part 114 may control the multi-articular arm 10 to move the leading end 4 in response to the guide manipulation. This ensures that the information obtainable at the multi-articular arm 10 can be effectively used in the control performed by the force guide control part 114, resulting in a simplified apparatus configuration.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A robot system, comprising:
   a robot comprising a leading end, a base, and a multi-articular arm configured to adjust a position and a posture of the leading end relative to the base; and
   a controller configured to control the multi-articular arm to
      move the leading end based on a motion control program that specifies a transition over time of a target position and a target posture of the leading end relative to the base, the transition including a correction target portion that starts and ends in the transition;
      control the multi-articular arm to move the leading end in response to a guided manipulation that applies an external force to the robot while the controller is controlling the multi-articular arm;
      obtain relative command information that is based on the target position and the target posture of the leading end at a start point of the correction target portion and that specifies the target position and the target posture of the leading end at points in the correction target portion including a start point and an end point in the correction target portion; and
      control the multi-articular arm to move the leading end from the position and the posture of the leading end based on the relative command information, beginning at a point of time when movement of the multi-articular arm controlled by the controller in response to the guided manipulation has ended, wherein
   the motion control program includes specifying information that specifies a predetermined timing, which is set in advance of the motion control program being executed and in advance of the guided manipulation, to temporarily stop the leading end while the motion control program is being executed, and
   the controller is further configured to control the multi-articular arm to temporarily stop the leading end at the predetermined timing that is set in advance of the motion control program being executed and in advance of the guided manipulation.

2. The robot system according to claim 1, wherein the motion control program includes correction target specifying information that specifies the correction target portion, and the controller is further configured to obtain the relative command information based on the correction target specifying information.

3. The robot system according to claim 1, wherein the controller is further configured to control the multi-articular arm such that the position and the posture of the leading end, beginning at a point of time when movement of the multi-articular arm controlled by the controller has ended, change to a position and a posture that are specified in the motion control program.

4. The robot system according to claim 1, wherein the controller is further configured to control the multi-articular arm to temporarily stop the leading end while the motion control program is being executed, and the controller is further configured to start, with the leading end temporarily stopping, controlling the multi-articular arm to move the leading end in response to the guided manipulation.

5. The robot system according to claim 4, wherein when the controller controls the multi-articular arm to move the leading end in response to the guided manipulation, the controller is further configured to restrict a movable range of the leading end, and the controller is further configured to control the multi-articular arm to temporarily stop the leading end with the leading end taking a position and a posture such that the target position and the target posture of the leading end, at the start point of the correction target portion, are included in the movable range.

6. The robot system according to claim 1, wherein when the controller controls the multi-articular arm to move the leading end in response to the guided manipulation, the controller is further configured to control the multi-articular arm to restrict a movable range of the leading end.

7. The robot system according to claim 1, wherein when the controller controls the multi-articular arm to move the leading end in response to the guided manipulation, the controller is further configured to control the multi-articular arm to restrict a degree of movement freedom of the leading end.

8. The robot system according to claim 1, wherein in response to a resumption command signal from a user, the controller is further configured to start controlling the multi-articular arm to move the leading end based on the relative command information.

9. The robot system according to claim 1, wherein in response to a stop command signal from a user, the controller is further configured to control the multi-articular arm to temporarily stop the leading end while the motion control program is being executed.

10. The robot system according to claim 1, wherein in response to a guide-on command signal from a user, the controller is further configured to start controlling the multi-articular arm to move the leading end in response to the guided manipulation.

11. The robot system according to claim 8, wherein in response to a resumption command signal input from the user by contacting the robot, the controller is further configured to start controlling the multi-articular arm to move the leading end based on the relative command information.

12. The robot system according to claim 1, wherein the controller is further configured to, in response to an increase of a resistant force against a motion of the robot controlled by the controller, control the multi-articular arm to stop the motion, which is counter the resistant force.

13. The robot system according to claim 1, wherein the robot includes a plurality of joints, and based on information concerning a torque acting on the plurality of joints, the controller is further configured to control the multi-articular arm to move the leading end in response to the guided manipulation.

14. A method for controlling a robot including a leading end, a base, and a multi-articular arm configured to adjust a position and a posture of the leading end relative to the base, the method comprising:

performing, using circuitry a controller, normal control that includes controlling the multi-articular arm to move the leading end based on a motion control program that specifies a transition over time of a target position and a target posture of the leading end relative to the base, the transition including a correction target portion that starts and ends in the transition;

performing, using the controller, force guide control that includes controlling the multi-articular arm to move the leading end in response to a guided manipulation that applies an external force to the robot during the normal control;

obtaining relative command information that is based on the target position and the target posture of the leading end at a start point of the correction target portion and that specifies the target position and the target posture of the leading end at points in the correction target portion including a start point and an end point of the correction target portion;

performing correction control that comprises controlling the multi-articular arm to move the leading end from the position and the posture of the leading end based on the relative command information beginning at a point of time when movement of the multi-articular arm under the force guide control has ended, the motion control program including specifying information that specifies a predetermined timing, which is set in advance of the motion control program being executed and in advance of the guided manipulation, to temporarily stop the leading end while the motion control program is being executed; and controlling the multi-articular arm to temporarily stop the leading end at the predetermined timing that is set in advance of the motion control program being executed and in advance of the guided manipulation.

15. The robot system according to claim 2, wherein the controller is configured to control the multi-articular arm so that the position and the posture of the leading end, at a point of time when movement of the multi-articular arm controlled by the controller has ended, change to a position and a posture that are specified in the motion control program.

16. The robot system according to claim 2, wherein the controller is further configured to control the multi-articular arm to temporarily stop the leading end while the motion control program is being executed, and the controller is further configured to start, with the leading end temporarily stopping, controlling the multi-articular arm to move the leading end in response to the guide manipulation.

17. The robot system according to claim 3, wherein the controller is further configured to control the multi-articular arm to temporarily stop the leading end while the motion control program is being executed, and the controller is further configured to start, with the leading end temporarily stopping, controlling the multi-articular arm to move the leading end in response to the guided manipulation.

18. The robot system according to claim 15, wherein the controller is further configured to control the multi-articular arm to temporarily stop the leading end while the motion control program is being executed, and the controller is further configured to start, with the leading end temporarily stopping, controlling the multi-articular arm to move the leading end in response to the guided manipulation.

19. The robot system according to claim 1, wherein
in response to a stop command signal from a user, the controller is further configured to control the multi-articular arm to temporarily stop the leading end while the motion control program is being executed, and when the controller controls the multi-articular arm to move the leading end in response to the guided manipulation, the controller is further configured to control the multi-articular arm to restrict a movable range of the leading end.

\* \* \* \* \*